United States Patent [19]

Uwabata et al.

[11] Patent Number: 5,103,295
[45] Date of Patent: Apr. 7, 1992

[54] TELEVISION SIGNAL PROCESSOR FOR ELIMINATING QUALITY DIFFERENCES BETWEEN PORTIONS OF TELEVISION IMAGES HAVING DIFFERENT ASPECT RATIOS

[75] Inventors: Hideyo Uwabata, Neyagawa; Yoshio Yasumoto, Nara; Sadashi Kageyama, Hirakata; Shuji Inoue, Neyagawa; Yoshio Abe, Ibaraki, all of Japan

[73] Assignee: Matsushita Electric Industrial Co., Ltd., Osaka, Japan

[21] Appl. No.: 513,813

[22] Filed: Apr. 25, 1990

[30] Foreign Application Priority Data

Apr. 28, 1989 [JP] Japan .................. 1-109363

[51] Int. Cl.⁵ .................. H04N 9/64; H04N 11/20; H04N 7/18
[52] U.S. Cl. .................. 358/21 R; 358/11; 358/105
[58] Field of Search .................. 358/21, 105, 11, 12

[56] References Cited

U.S. PATENT DOCUMENTS

| | | | |
|---|---|---|---|
| 4,845,562 | 7/1989 | Koslov et al. | 358/12 |
| 4,885,631 | 12/1989 | Fukinuki et al. | 358/21 R |
| 4,967,263 | 10/1990 | Dieterich | 358/11 |
| 4,989,090 | 1/1991 | Campbell et al. | 358/11 |

FOREIGN PATENT DOCUMENTS

| | | |
|---|---|---|
| 58-130685 | 8/1983 | Japan . |
| 59-171387 | 9/1984 | Japan . |
| 63-36681 | 2/1988 | Japan . |
| WO-89/02691 | 3/1989 | World Int. Prop. O. . |

OTHER PUBLICATIONS

IEEE Transactions on Consumer Electronics, vol. 34, No. 3, Aug. 1988, New York, S. Kayegama et al. "An NTSC Compatible Wide Screen Television System with Evolutionary Extendibility" pp. 460-467.
Patent Abstracts of Japan, unexamined applications, E Section, vol. y, No. 243, Oct. 28, 1983, The Patent Office Japanese Government, p. 22 E207.

Primary Examiner—Howard W. Britton
Assistant Examiner—Wendy R. Greening
Attorney, Agent, or Firm—Wenderoth, Lind & Ponack

[57] ABSTRACT

A main signal motion detection signal and a multiplex motion detection signal are processed to obtain a compensated motion detection signal. This signal is a motion detection signal for a portion other than a portion having an aspect ratio of 4:3. Thus, a television signal processor is provided which eliminates quality differences between images in the portion having an aspect ratio of 4:3 and images in the other portion having a different aspect ratio.

15 Claims, 8 Drawing Sheets

TELEVISION SIGNAL PROCESSOR FOR ELIMINATING QUALITY DIFFERENCES BETWEEN PORTIONS OF TELEVISION IMAGES HAVING DIFFERENT ASPECT RATIOS

BACKGROUND OF THE INVENTION

1. Field of the Invention

The present invention relates to a television receiver having a motion detector which detects the motion of images represented by received television signals, and more particularly to a television signal processor which receives video signals having a greater aspect ratio than that of the conventional television system having a 4:3 aspect ratio (the ratio of horizontal to vertical length), and which also regenerates television signals compatible with the conventional television system.

2. Description of the Prior Art

More than 36 years have passed since the color television broadcasting of the present NTSC (National Television System Committee) system started in the U.S.A. in 1954. During this peroid of time, various television systems have been advocated to meet the requirement for high-definition video images, following the improvement of the television receivers. TV programs are also changed from those originating in studios and by relay broadcasting to movies of cinema size which has video images of higher-definition accompanied with vivid reality.

The present broadcasting has specifications such as 525 scanning lines, an interlace scanning of 2:1, a luminance signal horizontal bandwidth of 4.2 MHz, and aspect ratio of 4:3 (Refer to "US Color Television Fundamentals-A Receiver", IEEE Trans. Consum. Electron., Vol. CE-23, pp. 467–478, Nov. 1977). When a movie is broadcast as a TV program, it is transmitted so that both left and right ends of its video image are cut off to make its aspect ratio 4:3 which fits the present television receiver, or so that image invalid areas are provided at upper and lower parts of an image plane to make an image valid area have the aspect ratio of movies.

As described above, when movies or other programs with vivid reality are transmitted or broadcast, a part of the video image is cut off, or the area of the video image is made smaller, such that the idea and intent of the producer or the director not be fully understood. If signals of an aspect ratio greater than 4:3 are transmitted as is, a usual receiver can not receive them. If the aspect ratio is m:3 (where m is a real number greater than 4), a video signal band of m/4 times is required in order to obtain the same horizontal resolution as the present broadcast system when the number of scanning lines and frame frequency are the same as that of the present broadcast system. But in order to effectively utilize the radio wave resources, the transmitting band should not be merely expanded.

Therefore, a television receiver which receives a video signal having an aspect ratio of more than 4:3, namely, of a wide aspect ratio, has been proposed (for example, refer to Japanese Laid-Open Patent Publication No. 63-36681).

In order to explain the conventional television signal processor, a method in which images of a wide aspect ratio are transmitted and received is discussed below. FIG. 10 shows a signal process to transmit an image having a wide aspect ratio. A transmission side forms a main signal by time multiplexing a signal which is formed by expanding with respect to time a portion having an aspect ratio of 4:3 (a center panel portion), and a signal which is formed by compressing with respect to time of low frequency components of portions having an aspect ratio of other than 4:3 (side panel portions). This main signal is subjected to a vestigial sideband amplitude modulation with a video carrier. This television signal, which is the vestigial sideband amplitude modulated signal, is properly multiplexed by a signal (multiplex signal) which is formed by expanding with respect to time of a high frequency component of the side panel portions, and is then transmitted. At a reception side, the television signal is separated and demodulated into the main signal and the multiplex signal to regenerate the image having a wide aspect ratio by doing the reverse of the process at the transmission side. The reception side has a YC separation circuit and a scan-converter circuit in order to obtain images of a high definition. In order to control the YC separation circuit and the scan-converter circuit, a motion detection circuit is required which respectively detects motion information of the main and multiplex signals (see Japanese Laid-Open Patent Publication No. 58-130685).

However, in the television signal processor receiving the image having a wide aspect ratio of the above configuration, the conventional motion detection circuit can not acquire a satisfactory high-definition image. If an object is moved, for example, in the horizontal direction, a spectral distribution of the low frequency components of the side panel portions is different from that of the center panel portion because the low frequency components of the side panel portions are compressed with respect to time before being transmitted, so that a motion detection signal of the center panel portion is different from a motion detection signal of the side panel portions. The high frequency components of the side panel portions are expanded with respect to time and then transmitted, so that a motion detection signal of the side panel portions is also different from that of the center panel portion. As a result, there is a problem that quality of the images at the center panel portion and the side panel portions are uneven especially when a moving image is displayed because of the difference in the motion detection signals.

SUMMARY OF THE INVENTION

An object of the present invention is to provide a television signal processor, which is compatible with the existing television system, and which can regenerate a television signal having a horizontally longer aspect ratio without differences in the quality of images between a portion having an aspect ratio of 4:3 (a center panel portion) and other portions having a different aspect ratio (side panel portions).

In order to achieve the above object, a television signal processor of the present invention comprises a demodulation circuit which demodulates a television signal formed by multiplexing a modulated main signal and a modulated multiplex signal into a main signal and a multiplex signal; a control signal generation circuit which inputs the main signal and outputs first and second control signals a time processing circuit which processes the multiplex signal with respect to time, a motion detection compensation circuit which detects a motion of the main signal and an output of the time processing circuit and respectively outputs first and second motion detection signals, and which also outputs the first motion detection signal according to the first control signal and a third motion detection signal according to the second motion detection signal; a main signal processing circuit which separates the main signal into a luminance signal and a chrominance signal according to the first motion detection signal; a multiplex signal processing circuit which separates the output of the time processing circuit into another luminance signal and another chrominace signal according to the second motion detection signal, and a composing circuit which synthesizes the outputs of the main signal processing circuit and the multiplex signal processing circuit according to the second control signal, and which converts this composite output according to the third motion detection signal. By compensating the motion detection signal in the above configuration, an image having an aspect ratio greater than 4:3 can be displayed without differences in the quality of images between the center panel portion and the side panel portions.

As it is obvious from the above explanation, the present invention can obtain the image of horizontally longer aspect ratio by regenerating the televisoin signal, which carries a video image having an aspect ratio greater than that of the existing system and can also be compatibly received by the existing television set, and can display the image having an aspect ratio greater than 4:3 without differences in quality of images between the center panel portion and the side panel portions by compensating the motion detection signals.

DETAILED DESCRIPTION OF THE PREFERRED EMBODIMENTS

Figure 1:
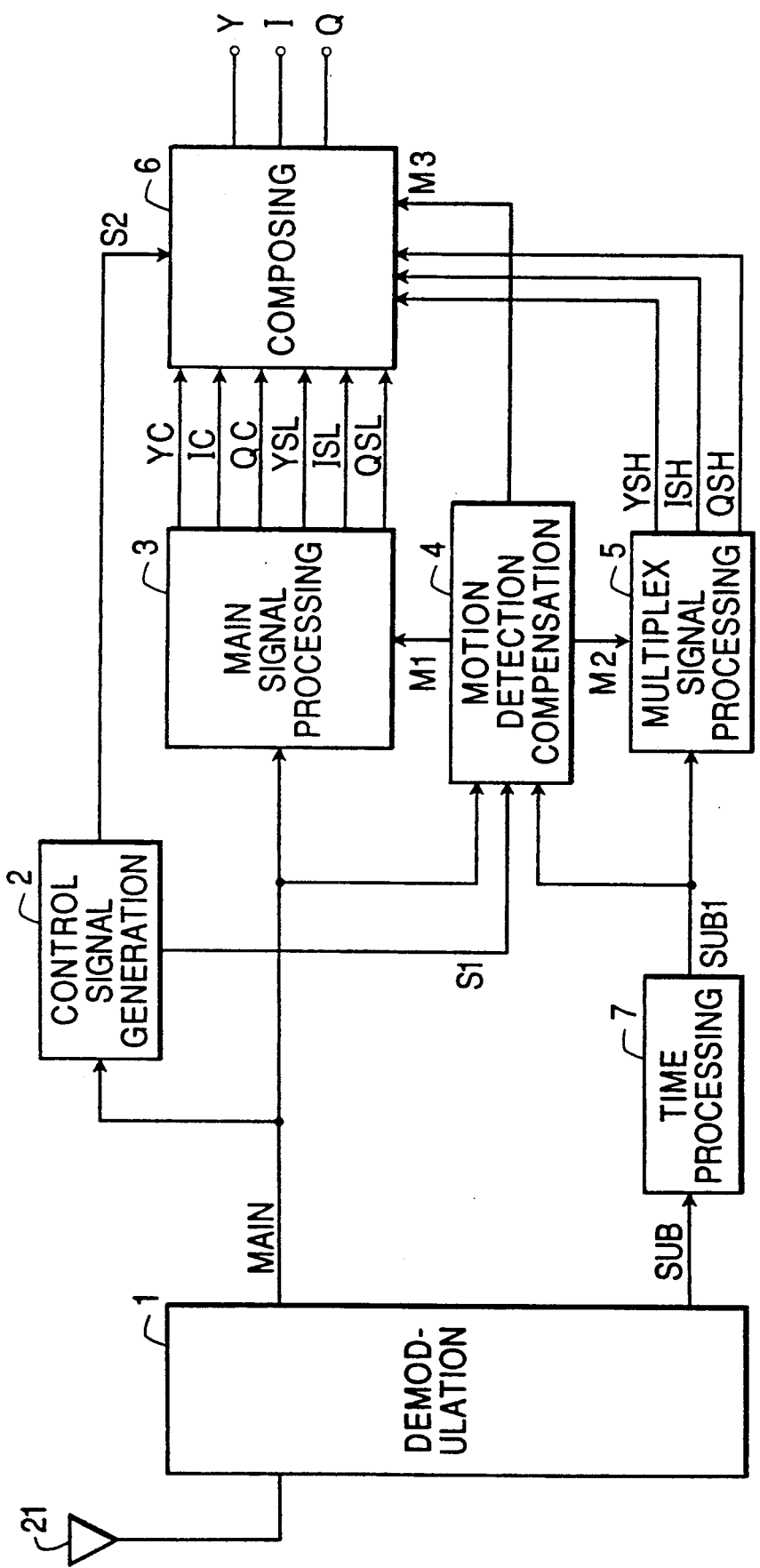
FIG. 1 is a block diagram of a television signal processor of the present invention.
Figure 10:
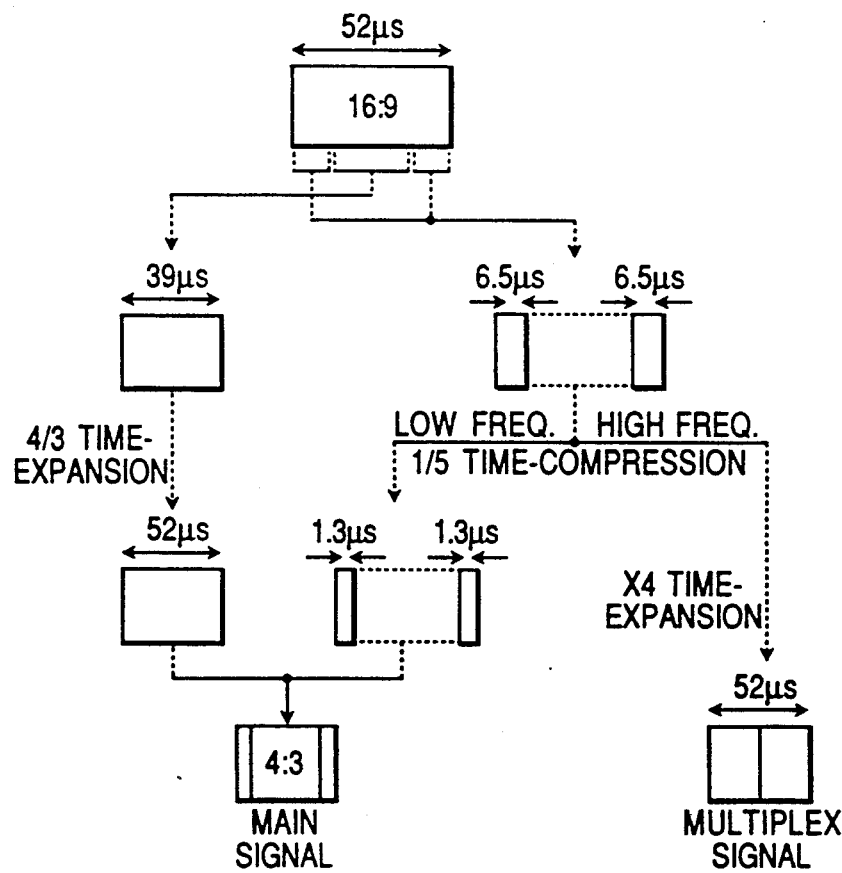
FIG. 10 is an explanation diagram of the conventional signal processing of wide aspect ratio video signals.

FIG. 1 is a block diagram of a televison signal processor of the present invention. Element 21 is an antenna; element 1 is a demodulation circuit; element 2 is a control signal generation circuit; element 3 is a main signal processing circuit; element 4 is a motion detection compensation circuit; element 5 is a multiplex signal processing circuit; element 6 is a composing circuit, and element 7 is a time processing circuit. A multiplexed signal formed by properly multiplexing a main signal and a multiplex signal by mean of a signal processing as shown in FIG. 10 is received via the antenna 21 and is separated and demodulated into the main signal and the multiplex signal. The signal does not have to be received via the antenna and can also be received via a cable. The main signal processing circuit 3 receives the main signal (MAIN) and an output M1 of the motion detection compensation circuit 4, and separates the main signal into main signals Ym, Im, and Qm, and then compresses a center panel portion with respect to time into main signals Yc, Ic, and Qc, and expands side panel portions with respect to time into main signals YsL, IsL, and QsL. The time axis processing circuit 7 receives the multiplex signal SUB and outputs a multiplex signal SUB1 which has been processed with respect to time. The time processing circuit 7 compresses with respect to time the signal which has been expanded with respect to time at the transmission side. The time processing circuit 7 expands with respect to time the signal which has been compressed with respect to time at the transmission side. Accordingly, the time processing circuit 7 performs the reverse time processing or adjustment to that of the transmission side in order to retain regular time relationships between the transmitting and reception sides as a whole. The multiplex signal processing circuit 5 receives SUB1 and an output M2 of the motion detection compensation circuit 4 and separates SUB1 into multiplex signals YsH, IsH, and QsH. The motion detection compensation circuit 4 inputs the main signal, an output S1 of the control signal generation circuit 2, and SUB1, and outputs the first, second, and third motion detection signals M1, M2, and M3. The composing circuit 6 adds the main signals YsL, IsL and QsL and the multiplex signals YsH, IsH, and QsH, selects the added result or the main signals Yc,. Ic, and Qc according to an output S2 of the control signal generation circuit 2, and scan-converts the selected signals according to the third motion detection signal M3 to obtain signals Y, I, and Q. The control signal generation circuit 2 generates from the main signal and outputs the control signals S1 and S2.

Figure 11:
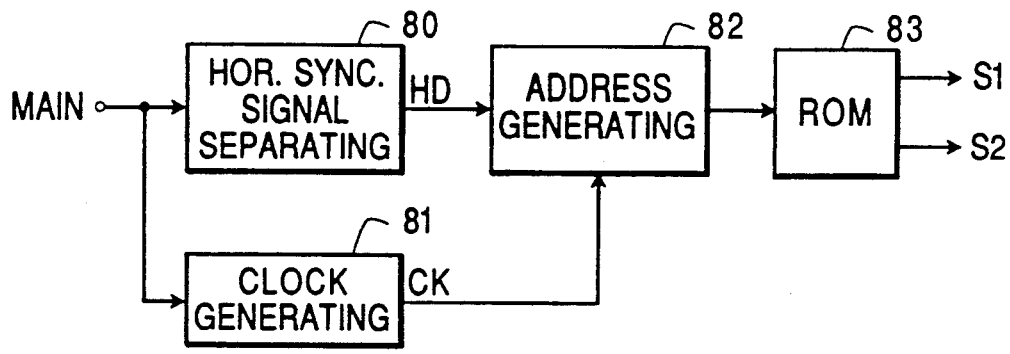
FIG. 11 is a block diagram of one example of a control signal generation circuit provided in the television signal processor of the present invention.
Figure 12:
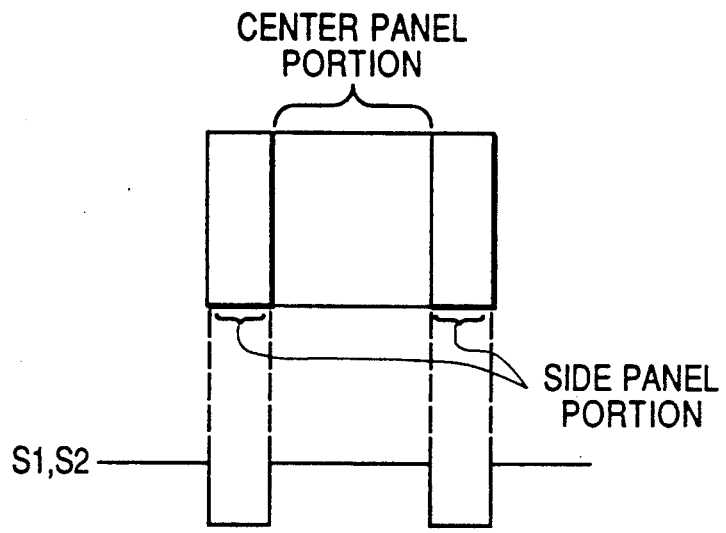
FIG. 12 is a diagram showing waveforms of outputs S1 and S2 of the control signal generation circuit provided in the television signal processor of the present invention.

FIG. 11 is a block diagram of one example of the control signal generation circuit 2. Element 80 is a horizontal synchronous signal separating circuit; element 81 is a clock generating circuit; element 82 is an address generating circuit, and element 83 is a ROM. The horizontal synchronous signal separating circuit 80 separates a horizontal synchronous signal HD from the main signal and outputs it. The clock generating circuit 81 inputs the main signal and outputs a clock CK of, for example, a frequency 4 times higher than that of a chrominance sub-carrier synchronized with a color burst. The address generation circuit 82 outputs an address which is counted down or counted up by means of the clock CK. The address generation circuit 82 outputs an address which is counted down or counted up by means of the clock CK. The address generation circuit 82 has the output reset by means of the HD signal. ROM 83 inputs the output of the address generation circuit 82 and outputs the control signals S1 and S2. S1 and S2 shows a wide image plane having an aspect ratio 16:9 as shown in FIG. 12 and become 0 at the side panel portions and 1 at the center panel portions.

Figure 2:
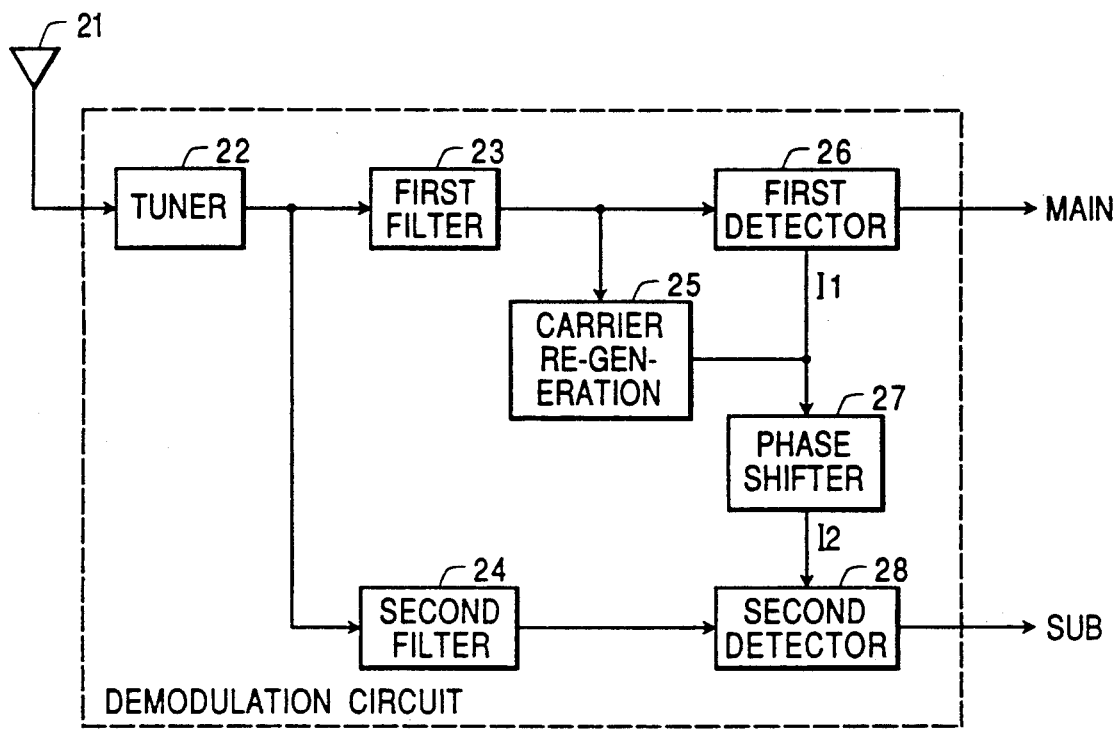
FIG. 2 is a block diagram of one example of a demodulation circuit provided in the television signal processor of the present invention.

Explained below is a case where the demodulation circuit 1 utilizes a method as shown in FIG. 2. In this case, a main signal is subjected to the vestigial side band amplitude modulation with the video carrier. The main signal has been formed by multiplexing with respect to time of a signal obtained by expanding with respct to time (preferably 4/3 times expanding) of a portion having an aspect ratio of 4:3 (the center panel of portion ) of the video signal which is taken from an original video image having an aspect ratio greater than 4:3 at the transmission side, and a signal obtained by compressing with respect to time of low frequency components of a video image having an aspect ratio greater than 4:3 (preferably 1/5 times compressed). This television signal, which is the vestigial sideband amplitude modulated signal, is multiplexed by a multiplex signal which is formed by expanding with respect to time of (preferably 4 times expanding) the high frequency components of the side panel portions, and double sideband modulating a carrier which has the same frequency as the video carrier and has a phase which is 90 degrees different from that of the video carrier, and band-limiting the modulated signal by an inverse Nyquist filter having a frequency characteristic which is symmetric to that of a Nyquist filter of a receiver.

FIG. 2 is a block diagram of one example of the demodulation circuit 1 of the television signal processor of the present invention. In FIG. 2, element 22 is a tuner; element 23 is a first filter; element 24 is a second filter; element 25 is a carrier regeneration circuit; element 26 is a first detector; element 27 is a phase shifter, and element 28 is a second detector. The signal transmitted from the transmission side is received at the antenna 21, transformed into the intermediate frequency in the tuner 22, and band-limited in the first filter 23. The first filter 23 is a Nyquist filter whose amplitude and phase frequency characteristics meet the Nyquist characteristics. The output signal of the first filter is supplied to the first detector 26 and the carrier regeneration circuit 25. In the carrier regeneration circuit 25, the carrier I1 for synchronous detection is regenerated from the output signal of the first filter 23. The band-limited signal from the filter 23 is synchronously detected by the carrier I1 in the first detector 26. The output of the first detector 26 is the main signal. The output of the tuner 22 is, on the other hand, band-limited by means of the second filter 24. The second filter 24 suppresses quadrature distortion from the main signal to the multiplex signal. The output signal of the second filter 24 is synchronously detected by a carrier I2 which has been formed by phase-shifting, in the phase shifter 27, the carrier I1 acquired from the carrier regeneration circuit 25. The phase-shifting direction of the carrier I2 is made the same as at the transmission side (90 degrees in this example). The detection output of the second detector 28 is the multiplex signal (SUB in FIG. 2).

Figure 3:
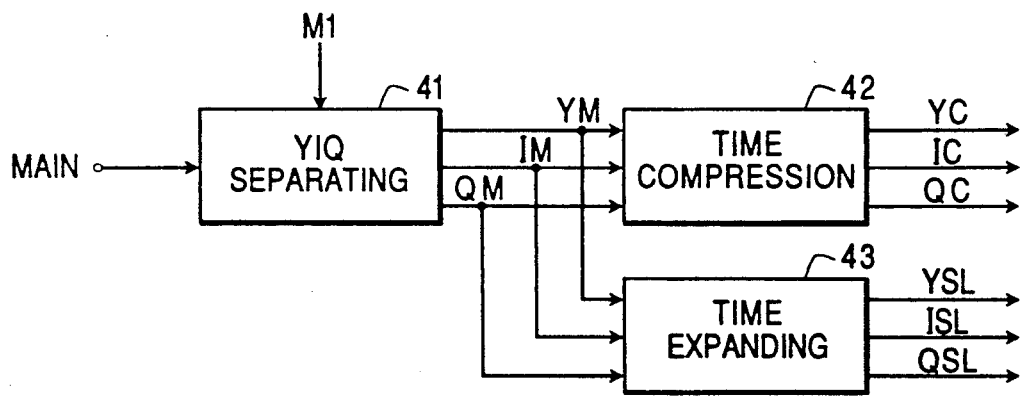
FIG. 3 is a block diagram of a main signal processing circuit provided in the television signal processor of the present invention.

FIG. 3 is a block diagram of one example of the main signal processing circuit 3. Element 41 is a YIQ separating circuit; element 42 is a time compression circuit, and element 43 is a time expansion circuit. The main signal and the output M1 of the motion detection compensation circuit are inputted into the YIQ separating circuit 41, and the main signal is divided into Ym, Im and Qm according to M1. For instance, the motion detection compensation circuit 4 outputs M1=0 at a pixel of a still image, and outputs M1=1 at a pixel of a moving image. According to M1, the main signal is separated into Ym, Im, and Qm. A time processing which is the reverse of that shown in FIG. 10 is performed on the signals Ym, Im, and Qm. The signals, which have been expanded with respect to time at the transmission side, at then center panel portion are the compressed with respect to time (preferably ¾ times compressed) by means of the time compression circuit 42, and become signals Yc, Ic, and Qc. The other signals compressed with respect to time at the transmission side are expanded with respect to time (preferably 5 times expanded) by means of the time expansion circuit 43, and become signals YsL, IsL, and QsL. In the time compression circuit 42 and time expansion circuit 43, the time processing and adjustments, which are reverse to those performed at the transmission side, are effected in order to assure the regular time relationships between the transmission and reception sides as a whole.

Figure 13:
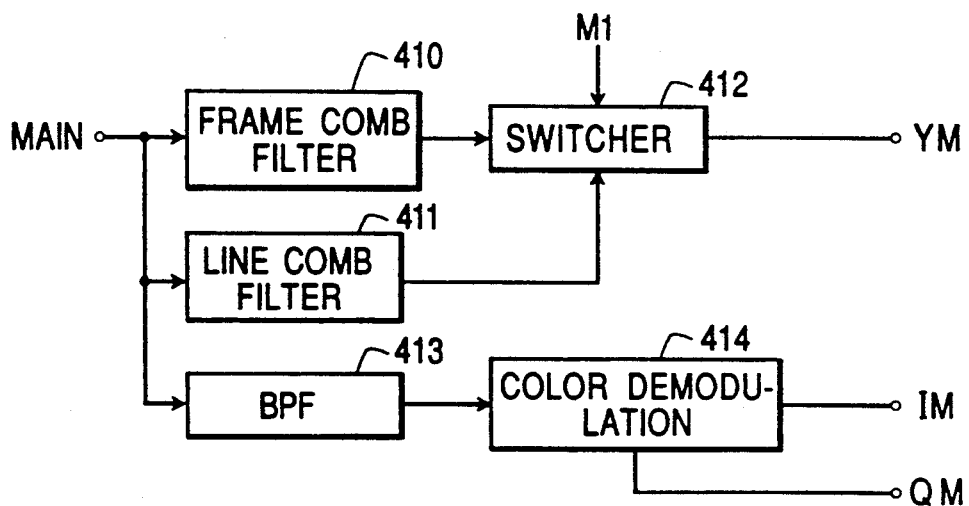
FIG. 13 is a block diagram of one example of a YIQ separating circuit provided in the television signal processor of the present invention.

FIG. 13 is a block diagram of one example of the YIQ separating circuit 41. Element 410 is a frame comb filter; element 411 is a line comb filter; element 412 is a switcher; element 413 is a band-pass filter (BPF), and element 414 is a color demodulation circuit. The frame comb filter 410 receives the main signal and outputs a sum signal between frames. The line comb filter 411 receives the main signal and outputs a sum signal between lines. The switcher 412 chooses the output signal of the frame comb filter 410 when the output M1 of the motion detection compensation circuit 4 is 0, and chooses the output signal of the line comb filter 411 when the output M1 of the motion detection compensation circuit 4 is 1. Then the switcher 412 outputs the luminance signal Ym formed by suppressing dot interruption of the main signal. The band-pass filter 413 separates the chrominance signal from the main signal, and the Im and Qm signals are demodulated by the color demodulation circuit 414 and are outputted.

Figure 4:
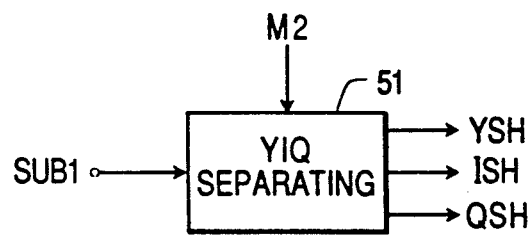
FIG. 4 is a block diagram of a multiplex signal processing circuit provided in the television signal processor of the present invention.

FIG. 4 is a block diagram of one example of the multiplex signal processing circuit 5. Element 51 is the YIQ separating circuit. The signal SUB1, which is compressed with respect to time (preferably ¼ times compressed) in the time processing circuit 7, is inputted into the YIQ separating circuit 51. The YIQ separating circuit 51 works in the same way as the YIQ separating circuit 41 and outputs the luminance signal YsH, the chrominance signal IsH, and the chrominance signal QsH according to the output M2 of the motion detection compensation circuit 4. The explanation of the YIQ separating circuit 51 has been omitted because it has basically the same working principle and circuit configuration as that of the YIQ separating circuit 41.

Figure 5:
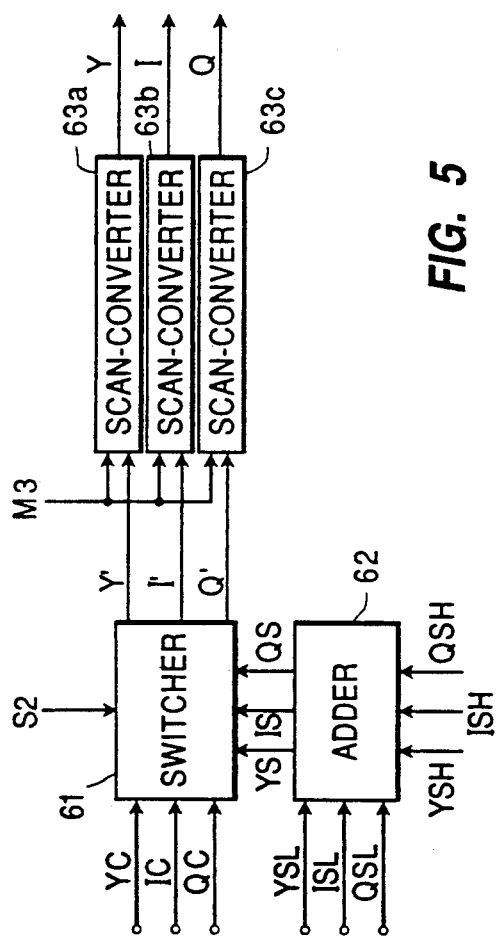
FIG. 5 is a block diagram of a composing circuit provided in the television signal processor of the present invention.

FIG. 5 is a block diagram of the composing circuit 6. Element 61 is a switcher; element 62 is an adder, and elements 63a, 63b, and 63c are scan-converter circuits.

The signals YsL, IsL, and QsL are added to the signals YsH, IsH, and QsH respectively in the adder 62, and become the signals Ys, Is, and Qs to be inputted into the switcher 61. In the switcher 61, the signals Yc, Ic, Qc and Ys, Is, Qs are switched according to the output S2 of the control signal generation circuit. S2 is a control signal for choosing the signals Yc, Ic, and Qc during a period corresponding to the center panel portion, and choosing the signals Ys, Is, and Qs, the output of the adder 62, during a period corresponding to the side panel portions. The output Y', I', and Q' are scan-converted in the scan-conversion circuits 63a–63c according to the output M3 of the motion detection compensation circuit 4 and become double speed signals Y, I, and Q to be outputted.

Figure 14:
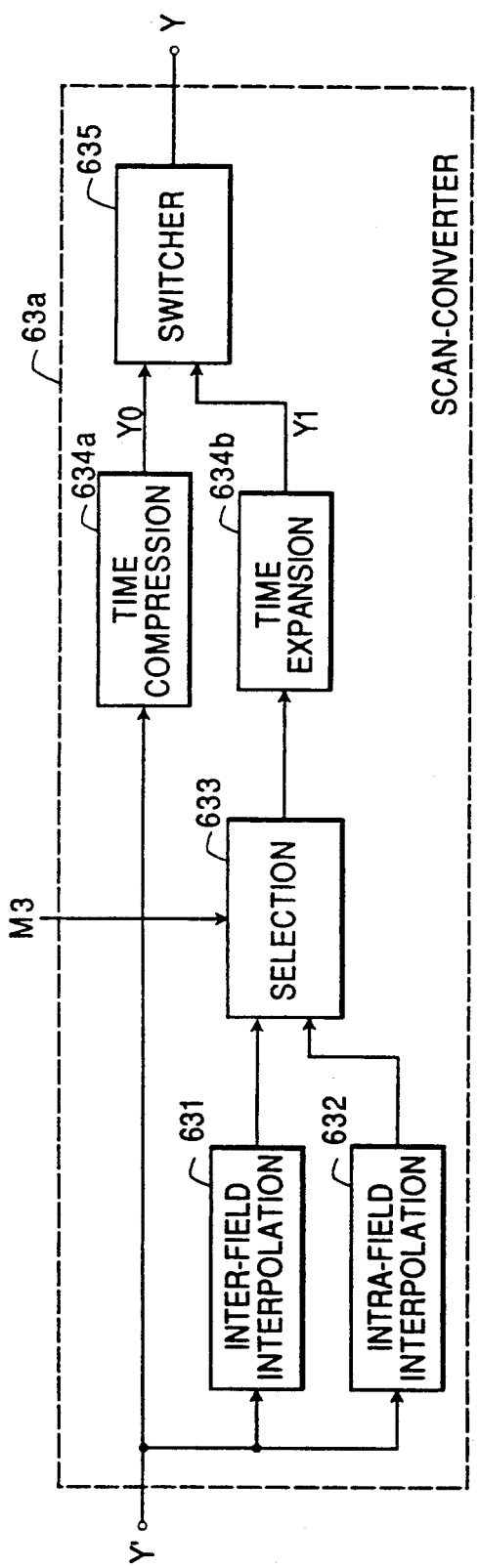
FIG. 14 is a block diagram of one example of a scan-converter circuit provided in the television signal processor of the present invention.

FIG. 14 is a block diagram of one example of the scan-conversion circuits 63a–63c. Element 631 is an inter-field interpolation circuit; element 632 is an intra-field interpolation circuit; element 633 is a selection circuit; elements 634a and 634b are time compression circuits, and element 635 is a switcher. Explained below is a case where the signal Y' is scan-converted and made into the double speed signal Y. The inter-field interpolation circuit 631 receives the signal Y' and outputs the signal of the last field as an interpolation signal. The intrafield interpolation circuit 632 adds two successive lines of one field and multiplies the added result by ½, and then outputs the multiplied result as an interpolation signal. The selection circuit 633 chooses and outputs the output of the inter-field interpolation circuit 631 when the output M3 of the motion detection compensation circuit 4 is 0, and the selection circuit 633 chooses and outputs the output of the intra-field interpolation circuit 632 when the output M3 of the motion detection compensation circuit 4 is 1. The time compression circuits 634a and 634b compress the signal Y' and the output signal of the selection circuit 633 by ½ with respect to time, and outputs Y0 and Y1. The switcher 635 alternately switches between Y0 and Y1 to output the double speed signal Y. The signals I' and Q' are converted into the double speed signals I and Q respectively by the scan-converter circuits 63b and 63c in the same way as above.

Figure 6:
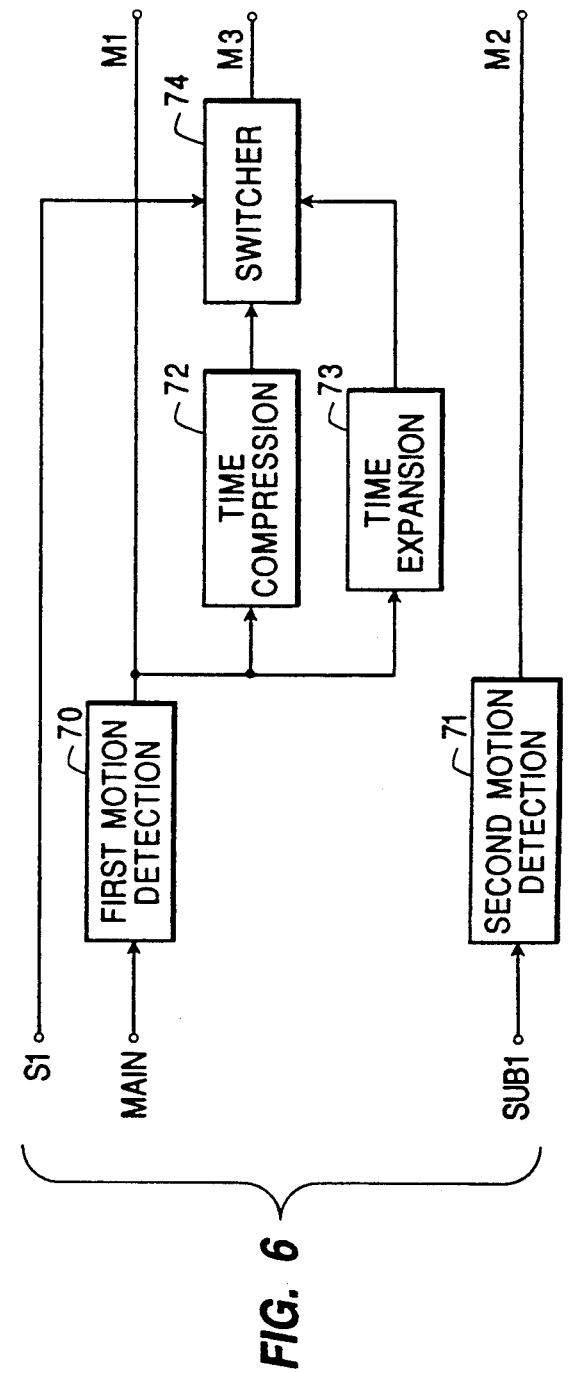
FIG. 6 is a block diagram of a motion detection compensation circuit of a first embodiment provided in the television signal processor of the present invention.

Explained below is the motion detection compensation circuit 4 used in the television signal processor of the present invention. FIG. 6 is a block diagram of one example of the motion detection compensation circuit 4 of the television signal processor of the present invention. Element 70 is a first motion detection circuit; element 71 is a second motion detection circuit; element 72 is a time compression circuit; element 73 is a time expansion circuit, and element 74 is a switcher.

The first motion detection circuit 70 receives the main signal and outputs the main signal motion detection signal M1. Similarly, the second motion detection circuit 71 receives the multiplex signal and outputs the multiplex signal motion detection signal M2. The signal, corresponding to the center panel portion, of the output of the first motion detection circuit 70 is compressed with respect to time by the time compression circuit 72, and the signal, corresponding to the side panel portions, of the output of the first motion detection circuit 70 is expanded with respect to time by the time expansion circuit 73. The switcher 74 is controlled by means of the control signal S1, and outputs the output of the time compression circuit 72 as the motion detection signal M3 for scan-conversion during the period corresponding to the center panel, and outputs the output of the time expansion circuit 73 as the motion detection signal M3 for scan-conversion during the other period corresponding to the side panel portions. The time expansion and compression can be effected by changing the writing and reading clock of a memory, and the time expansion and compression ratios are decided according to the ratio of the time processing at the transmission side. The motion detection signals M1, M2, and M3 can be 1 bit data, which become 0 when the motion detection circuit detects a still image and become 1 when the motion detection circuit detects a moving image, for example. Or, classifying the images into 4 kinds, the motion detection signal can be 2-bit data, which becomes 00 when a completely still image is detected, 01 when a relatively still image is detected, 10 when a relatively moving image is detected, and 11 when a completely moving image is detected. The images can be classified into even more numbers of types. Accordingly, the motion detection signals M1, M2, and M3 provide the motion information of each pixel necessary for each of the YIQ separating circuit and the scan-conversion circuit to perform different processings according to the motion of the images. As shown in FIG. 5, the motion detection signal M3 has been subjected to the same time-axis compression and expansion as those performed for the main and multiplex signals to obtain the Y, I, Q signals.

Figure 15:
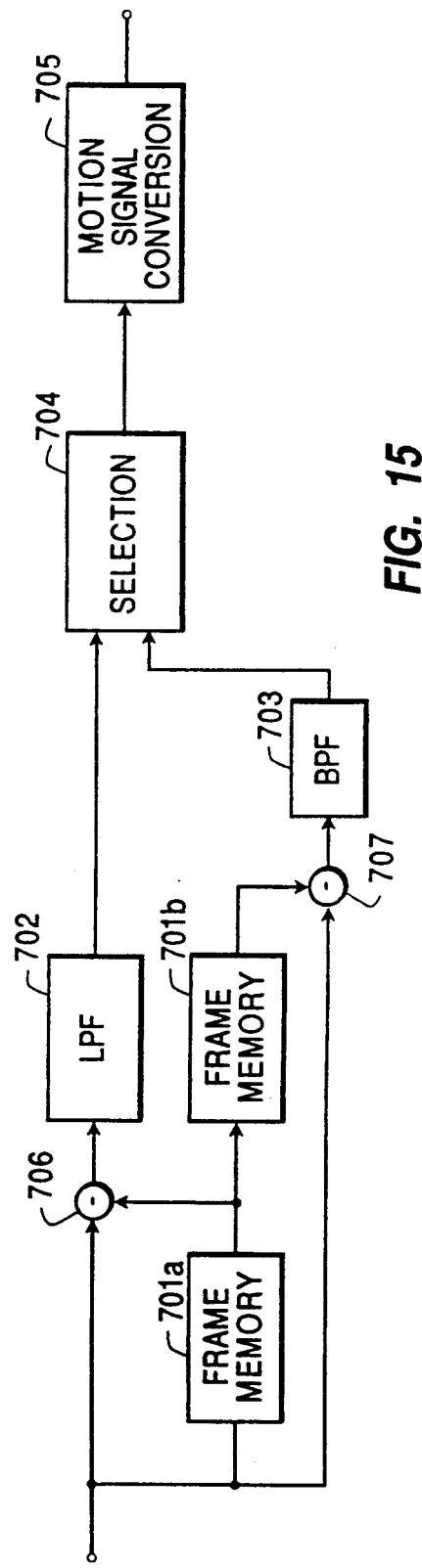
FIG. 15 is a block diagram of one example of the motion detection circuit provided in the television signal processor of the present invention.

FIG. 15 is one example of the first or second motion detection circuit 70 or 71. Elements 701a and 701b are frame memories; element 702 is a low-pass filter (LPF); element 703 is a band-pass filter (BPF); element 704 is a selection circuit; element 705 is a motion signal conversion circuit, and elements 706 and 707 are subtractors. Explained below is a case of the first motion detection circuit 70 in which the main signal is inputted. A difference between the main signal and a delayed signal obtained by delaying the main signal by 1 frame by means of the frame memory 701a is obtained by the subtractor 706, and further band-limited by the low-pass filter 702 (for instance, having a passband of about 2 MHz). The output of the low-pass filter 702 is for detecting the motion of the low frequency component of the luminance signal. The low-pass filter 702 outputs a value closer to 0 at a still portion of the luminance signal and outputs a greater value at a moving image portion. A difference between the main signal and a delayed signal obtained by delaying the main signal by 2 frames by means of two frame memories 701a and 701b is obtained by the subtractor 707, and further band-limited by the band-pass filter 703, (for instance having a passband of about ±1.5 MHz and having a central frequency of 3.58 MHz).

The output of the band-pass filter 703 is for detecting the motion of the high frequency component of the luminance signal and the motion of the chrominance signal. The band-pass filter 703 outputs a value closer to 0 at a still portion of the high frequency component of the luminance signal and at a still portion of the chrominance signal, and outputs a greater value at a moving image portion. The selection circuit 704 outputs greater value one of the outputs of the low-pass filter 702 and the band-pass filter 703. The motion signal conversion circuit 705 outputs 0 when the output of the selection circuit 704 is smaller than a predetermined threshold value, and outputs 1 when it is larger than the threshold value. The threshold value is predetermined, and if this threshold value is set near 0, the output M1 of the first motion detection circuit becomes 1 in most of the cases, and the image is detected as a moving image.

Figure 7:
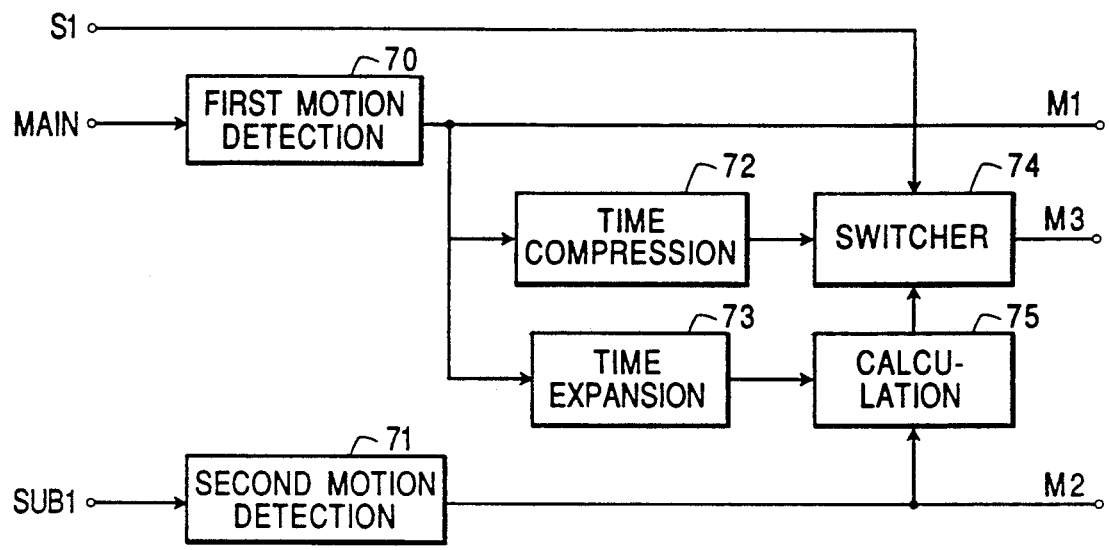
FIG. 7 is a block diagram of a motion detection compensation circuit of a second embodiment provided in the television signal processor of the present invention.

FIG. 7 is another embodiment of the motion detection compensation circuit 4 used in the television signal processor of the present invention. Element 70 is the first motion detection circuit; element 71 is the second motion detection circuit; element 72 is the time compression circuit; element 73 is the time expansion circuit; element 74 is the switcher, and element 75 is a calculation circuit. The first motion detection circuit 70 receives the main signal and outputs the main signal motion detection signal M1. Similarly, the second motion detection signal 71 receives the multiplex signal and outputs the multiplex signal motion detection signal M2. As for the output of the first motion detection circuit 70, its center panel portion is compressed with respect to time by means of the time compression circuit 72 and the side panel portions are expanded with respect to time by means of the time expansion circuit 73. On the other hand, the outputs of the second motion detection circuit 71 and of the time expansion circuit 73 are subjected to a calculation in the calculation circuit 75, and the calculated result is inputted into the switcher 74. The switcher 74 is controlled by the control signal S1, and outputs the output of the time compression circuit 72 as the motion detection signal M3 for scan-conversion during the period corresponding to the center panel portion, and outputs the output of the operational circuit 75 as the motion detection signal M3 for scan-conversion during the other period corresponding to the side panel portions. The calculation circuit 75, for example, outputs the greater of the two input signals in order to prevent an errors such as performing the still image processing on a moving image. The calculation circuit 75 can also prevent errors as above by outputting a logical sum of the two input signals. In addition, the calculation circuit 75 can also prevent errors as above by outputting an arithmetic sum of the two input signals.

Figure 8:
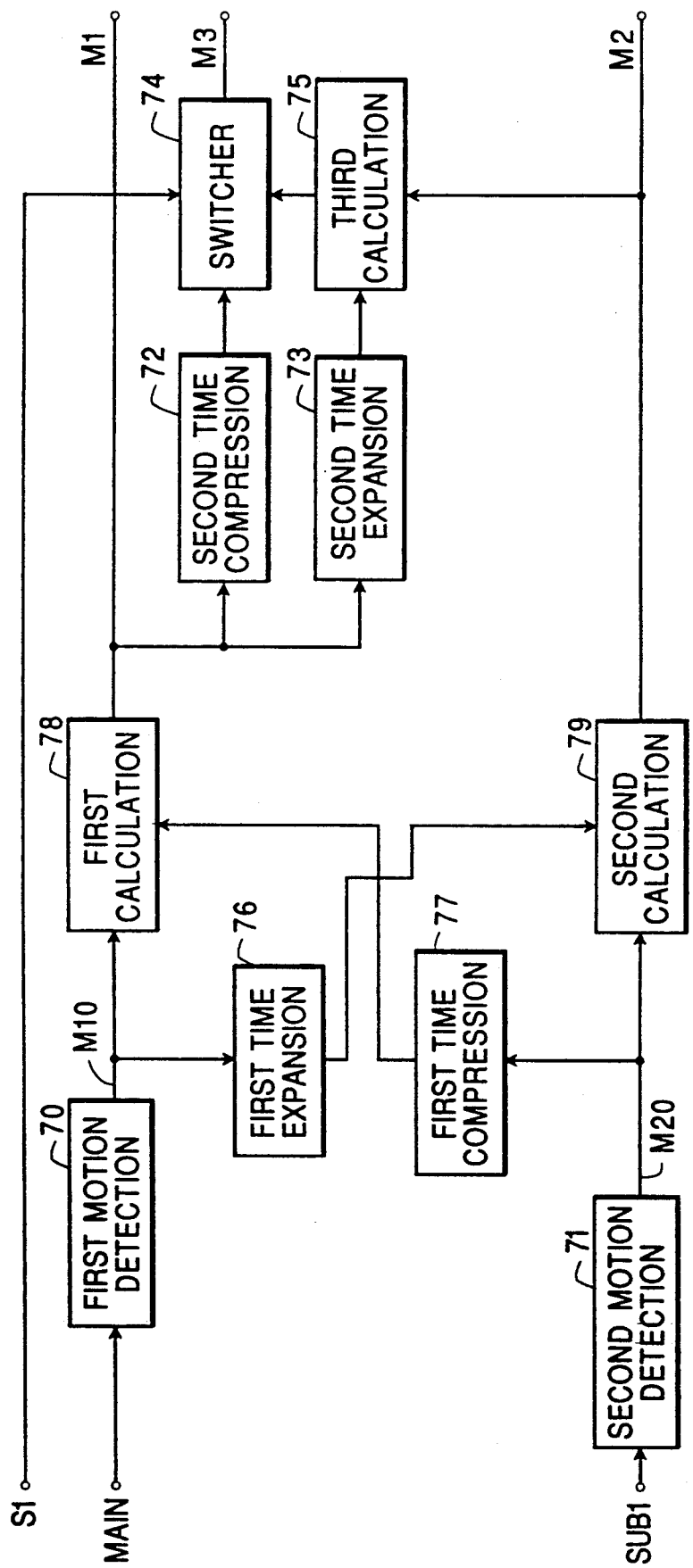
FIG. 8 is a block diagram of a motion detection compensation circuit of a third embodiment provided in the television signal processor of the present invention.

FIG. 8 is further embodiment of the motion detection compensation circuit 4 used in the television signal processor of the present invention. Element 70 is the first motion detection circuit; element 71 is the second motion detection circuit; element 76 is a first time expansion circuit; element 73 is a second time expansion circuit; element 77 is a first time compression circuit; element 72 is a second time compression circuit; element 78 is a first calculation circuit; element 79 is a second calculation circuit; element 75 is a third calculation circuit, and element 74 is the switcher. The first motion detection circuit 70 receives the main signal and outputs a motion detection signal M10. Similarly, the second motion detection signal 71 receives the multiplex signal and outputs a motion detection signal M20. The output of the first motion detection circuit 70 is expanded with respect to time by means of the first time expansion circuit 76 and then is operated together with the output M20 of the second motion detection circuit 71 in the second calculation circuit 79, whose output becomes the multiplex signal motion detection signal M2. The output M20 of the second motion detection circuit 71 is compressed with respect to time by means of the first time compression circuit 77 and is operated upon together with the output of the first motion detection circuit 70 in the first calculation circuit 78, whose output becomes the main signal motion detection signal M1. Furthermore, as for the output M1 of the first operational circuit 78, its signal corresponding to the center panel portion is compressed with respect to time by means of the second time compression circuit 72, and at the same time its signal corresponding to the side panel portions is expanded with respect to time by means of the second time-axis expansion circuit 73. On the other hand, the output M2 of the second operational circuit 79 is operated upon by the output of the second time expansion circuit 73 in the third calculation circuit 75, whose output is inputted into the switcher 74. Each of the first, second, and third calculation circuits 78, 79, and 75 for example, outputs the greater of the two input signals in order to prevent errors such as performing the still image process on a moving image. Each of the first, second, and third calculation circuits 78, 79, and 75 can also prevent errors as above by outputting a logical sum of the two input signals. In addition, each of the calculation circuits 78, 79 and 75 can also prevent errors as above by outputting an arithmetic sum of the two input signals.

The switcher 74 is controlled by the control signal S1, outputs the output of the second time compression circuit 72 as the motion detection signal M3 for scan-conversion during the period corresponding to the center panel portion, and outputs the output of the third operational circuit 75 as the motion detection signal M3 for scan-conversion during the other period corresponding to the side panel portions.

The motion detection compensation circuit shown in FIG. 8 can be modified to a configuration in which there is no third calculation circuit 75, namely, the outputs of the second time compression and expansion circuits 72 and 73 are inputted into the switcher 74.

Figure 9:
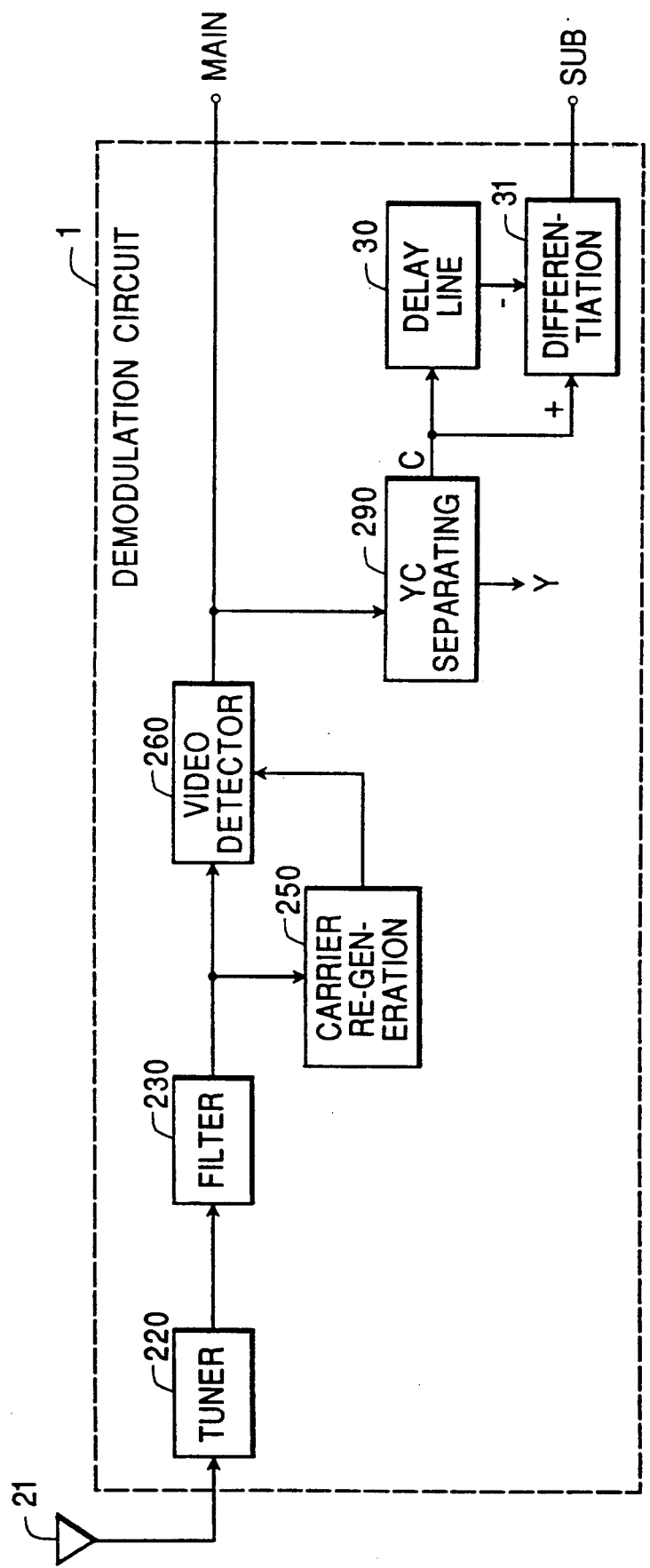
FIG. 9 is a block diagram of another example of the demodulation circuit provided in the television signal processor of the present invention.

Hereinafter explained is a case in which the demodulation circuit 1 of the main and multiplex signals has a configuration as shown in FIG. 9. Element 220 is a tuner; element 230 is a filter; element 260 is a video detector; element 250 is a carrier regenerator; element 290 is a YC separating circuit; element 30 is a delay line, and element 31 is a differentiation circuit. A frequency interleaving method is such that a multiplex signal is multiplexed in the first and third quadrants positioned in conjugate to a chrominance sub-carrier in the temporary-vertical frequency plane of the television signals (refer to Japanese Laid-Open Patent Publication No. 59-171387). In this case, the signal which has been transmitted from the transmission side is received at the antenna 21, and is converted into the intermediate frequency band in the tuner 220. The filter 230 is a Nyquist filter of which the amplitude and phase frequency characteristics meet the Nyquist characteristics. The band-limited signal is supplied to the video detector 260 and the carrier regenerator 250. In the carrier regenerator 250, the carrier for synchronous detection is regenerated. The output signal of the filter 230 is synchronously detected by means of the carrier in the video detector 260. The output of the video detector 260 is the main signal. On the other hand, the output of the video detector 260 is separated in the YC separating circuit 290 into the luminance signal Y and the chrominance signal C superposed by the multiplex signal. The luminance signal Y is not shown in the drawing. The chrominance signal C superposed by the multiplex signal is delayed by one field period (262H) by means of the delay line 30, and the multiplex signal is separated by differentiating the multiplex signal from the multiplex-signal-superposed chrominance signal C in the differentiation circuit 31. In FIG. 9, an antenna is shown; however, the transmitting route may not necessarily be a wireless system but may be a cable system.

In the present invention, the multiplex signal can be a signal which is multiplexed on a vertical over-scan portion (vertical over-scan) of the television signal or which is multiplexed on the upper and lower portions of the vertical scanning.

What is claimed is:

1. A television signal processor comprising:
   a demodulating means for receiving a television signal formed by multiplexing a modulated main signal and a modulated multiplex signal and for demodulating the television signal to obtain a main signal and a miltiplex signal;
   a control signal generating means for generating from said main signal a first control signal and a second control signal;
   a time processing means for processing said multiplex signal with respect to time;
   a motion detection compensating means for detecting motions of said main signal and an output of said time processing means to output a first and a second motion detection signals, and for outputting a third motion detection signal from said first and second motion detection signals according to said first control signal;
   a main signal processing means for dividing the main signal into a luminance signal and a chrominance signal according to said first motion detection signal;
   a multiplex signal processing means for dividing the output of said time processing means into another luminance signal and another chrominance signal according to said second motion detection signal;
   a synthesizing means for synthesizing outputs of said main signal processing means and said multiplex signal processing means according to said second control signal and converting the synthesized results according to said third motion detection signal.

2. A television signal processor according to claim 1, wherein from an electrical signal obtained by taking an original video image of an aspect ratio greater than 4:3, a first signal of an aspect ratio 4:3 is expanded with respect to time to form a composite video signal, and a low frequency component of a second signal obtained from a remainder of said electrical signal other than said first signal is compressed with respect to time and then is multiplexed with said composite video signal with respect to time to form said main signal.

3. A television signal processor according to claim 1, wherein from an electrical signal obtained by taking an original video image of an aspect ratio greater than 4:3, a high frequency component of a second signal obtained from said electrical signal other than a first signal of an aspect ratio 4:3 is expanded with respect to time to form said multiplex signal.

4. A television signal processor according to claim 1, wherein said demodulating means comprises: a means for receiving a television signal formed by superposing a vestigial-side-band-amplitude-modulated signal and a signal obtained by passing a double-side-band-amplitude-modulated signal with a carrier having the same frequency as and a 90 degree different phase from a carrier of said vestigial-side-band-amplitude-modulated signal through an inverse Nyquist filter having amplitude characteristics symmetric to a Nyquist filter at a transmission side with regard to a frequency of said carrier to be a vestigial-side-band signal; a turner for converting the television signal into an intermediate frequency signal; a Nyquist filter for band-limiting an output of said tuner; carrier regenerating means for regenerating a carrier I1 from an output of said Nyquist filter; a first detecting means for synchronously detecting the output of said Nyquist filter by means of said carrier I1 to obtain said main signal; a filter for suppressing quadrature distortion from the output of said tuner, and a second detecting means for synchronously detecting an output of said filter by means of a carrier I2 having the same frequency as and a 90 degree different phase from said carrier I1 to obtain said multiplex signal.

5. A television signal processor according to claim 1, wherein said demodulating means comprises: a means for receiving a television signal in which said multiplex signal is superposed in first and third quadrants on a two-dimensional plane of a temporal frequency and a vertical frequency of the television signal; a tuner for converting the television signal into an intermediate frequency signal; a Nyquist filter for band-limiting an output of said tuner; a carrier regenerating means for regenerating a carrier I from an output of said Nyquist filter; a detecting means for synchronously detecting the output of said Nyquist filter by means of said carrier I to output said main signal; a YC separating means for separating an output of said detecting means; a delaying means for delaying an output of said YC separating means by 1 field, and a means for differentiating the output of said YC separating means and an output of said delaying means to obtain said multiplex signal.

6. A television signal processor according to claim 1, wherein said control signal generating means generates from said main signal a first control signal and a second control signal which identify a portion corresponding to an image of an aspect ratio 4:3 and a portion corresponding to an image having an aspect ratio other than an aspect ratio 4:3.

7. A television signal processor according to claim 1, wherein said main signal processing means separates said main signal into said luminance signal and said chrominance signal according to said first motion detection signal, and compresses with respect to time a portion corresponding to an image of an aspect ratio 4:3, and expands with respect to time a portion corresponding to an image having an aspect ratio other than an aspect ratio 4:3.

8. A television signal processor according to claim 1, wherein said time processing means compresses the multiplex signal with respect to time.

9. A television signal processor according to claim 1, wherein said multiplex processing means separates the output of said time processing means into said another luminance signal and said another chrominance signal according to said second motion detection signal.

10. A television signal processor according to claim 1, wherein said synthesizing means synthesizes the output of said main signal processing means and the output of said multiplex signal processing means according to said second control signal, and then converts the synthesized result according to said third motion detection signal.

11. A television signal processor comprising:
   a demodulating means for receiving a television signal formed by multiplexing a modulated main signal and a modulated multiplex signal and for demodulating the television signal to obtain a main signal and a multiplex signal;

a control signal generating means for generating from said main signal a first control signal and a second control signal;

a first motion detection means for detecting motion of said main signal and outputting a first motion detection signal;

a time processing means for processing said multiplex signal with respect to time;

a second motion detection means for detecting motion of an output of said time processing means and for outputting a second motion detection signal;

a time compressing means for compressing an output of said first motion detection means with respect to time;

a time expanding means for expanding an output of said first motion detection means with respect to time;

a switching means for outputting a third motion detection signal by switching between outputs of said time expanding means and said time compressing means according to said first control signal;

a main signal processing means for separating the main signal into a luminance signal and a chrominance signal according to said first motion detection signal;

a multiplex signal processing means for separating said multiplex signal into another luminance signal and another chrominance signal according to said second motion detection signal;

a synthesizing means for synthesizing outputs of said main signal processing means and said multiplex signal processing means according to said second control signal and converting the synthesized result according to said third motion detection signal.

12. A television signal processor comprising:

a demodulating means for receiving a television signal formed by multiplexing a modulated main signal and a modulated multiplex signal and for demodulating the television signal to obtain a main signal and a multiplex signal;

a control signal generating means for generating from said main signal a first control signal and a second control signal;

a first motion detection means for detecting means of said main signal and for outputting a first motion detection signal;

a time processing means for processing said multiplex signal with respect to time;

a second motion detection means for detecting motion of an output of said time processing means and for outputting a second motion detection signal;

a time compressing means for compressing an output of said first motion detection means with respect to time;

a time expanding means for expanding the output of said first motion detection means with respect to time;

an operating means for operating upon an output of said time expanding means and an output of said second motion detection means;

a switching means for outputting a third motion detection signal by switching between outputs of said time compressing means and said operating means according to said first control signal;

a main signal processing means for separating the main signal into a luminance signal and a chrominance signal according to said first motion detection signal;

a multiplex signal processing means for separating said multiplex signal into another luminance signal and another chrominance signal according to said second motion detection signal;

a synthesizing means for synthesizing outputs of said main signal processing means and said multiplex signal processing means according to said second control signal and converting the synthesized results according to said third motion detection signal.

13. A television signal processor according to claim 12, wherein said operating circuit compares the two signals inputted thereto and outputs the larger of the two signals.

14. A television signal processor comprising;

a demodulating means for receiving a television signal formed by multiplexing a modulated main signal and a modulated multiplex signal and for demodulating the television signal to obtain a main signal and a multiplex signal;

a control signal generating means for generating from said main signal a first control signal and a second control signal;

a first motion detection means for detecting motion of said main signal and outputting a first motion detection signal;

a time processing means for processing said multiplex signal with respect to time;

a second motion detection means for detecting motion of an output of said time processing means and for outputting a second motion detection signal;

a first time expanding means for expanding the output of said first motion detection means with respect to time;

a first time compressing means for compressing the output of said second motion detection means with respect to time;

a first operating means for operating upon the output of said first motion detection means and an output of said first time compressing means;

a second operating means for operating upon the output of said second motion detection means and an output of said first time expanding means;

a second time compressing means for compressing an output of said first operating means with respect to time;

a second time expanding means for expanding the output of said first operating means with respect to time;

a third operating means for operating upon an output of said second time expanding means and an output of said second operating means;

a switching means for outputting a third motion detection signal by switching outputs of said second time compressing means and said third operating means according to said first control signal;

a main signal processing means for separating the main signal into a luminance signal and a chrominance signal according to said first motion detection signal;

a multiplex signal processing means for separating said multiplex signal into another luminance signal and another chrominance signal according to said second motion detection signal;

a synthesizing means for synthesizing outputs of said main signal processing means and said multiplex signal processing means according to said second control signal and converting the synthesized results according to said third motion detection signal.

15. A television signal processor according to claim 14, wherein each of said first, second and third operating means compares the two signals inputted thereto and outputs the larger of the two signals.

* * * * *